United States Patent Office 3,445,895
Patented May 27, 1969

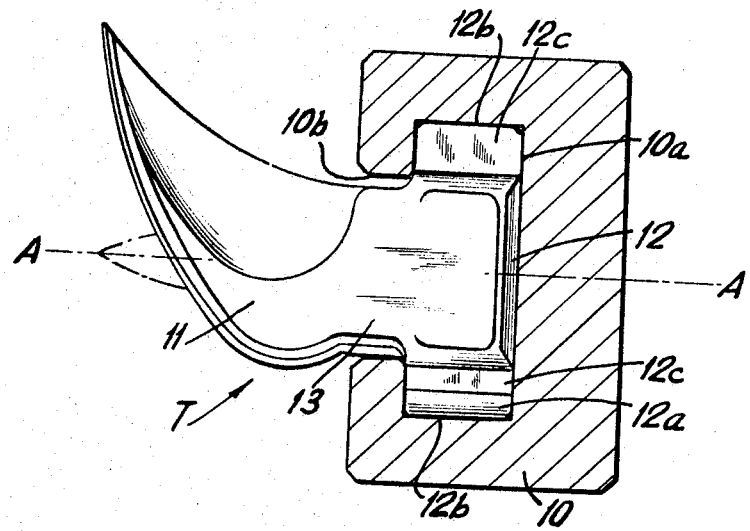
FIG. 2
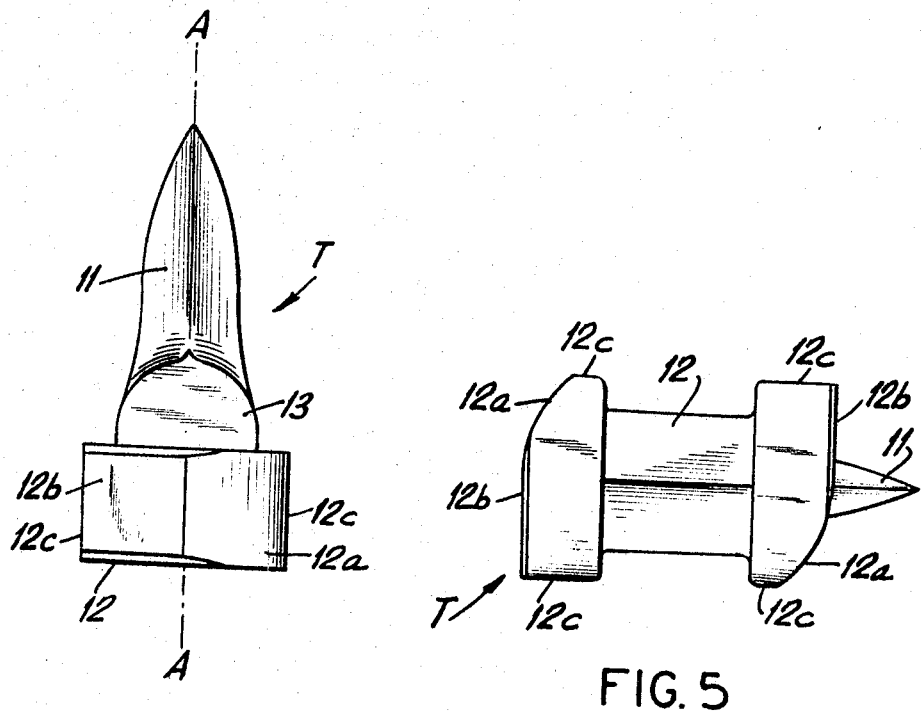
FIG. 4
FIG. 5

3,445,895
PICKER TOOTH
Hooshang Barbod, El Segundo, Calif., assignor to Crompton & Knowles Corporation, Worcester, Mass., a corporation of Massachusetts
Filed July 12, 1967, Ser. No. 652,940
Int. Cl. D01b 1/00; D01g 19/00
U.S. Cl. 19—97  3 Claims

ABSTRACT OF THE DISCLOSURE

A mass of fibers can be shredded by a series of picker teeth having respective bases closely received in an enlarged portion of a longitudinal slot in a picker bar, each tooth also having a shank extending through a reduced portion of the slot and joining the base to the pointed working part of the tooth located outside the bar. Each base has opposite end surfaces closely opposing and slidable along the respective side walls of the slot's enlarged portion, and the base also has opposite side surfaces extending transversely of the slot, the width of the slot's reduced portion being greater than the width of the base between its opposite side surfaces but less than the length of the base between its opposite end surfaces. Each base also has opposite corners rounded on a radius such as to permit rotation of the tooth to a position in which the length of its base extends lengthwise of the slot instead of transversely thereof. Substantial movement of the bases lengthwise of the slot is prevented by means which are releasable to permit removal of at least one end tooth while its base extends transversely of the slot, whereby a remote defective tooth can be rotated to allow its base to be withdrawn through the slot's reduced portion.

---

This invention relates to pickers such as those used for shredding masses of mangled fibers. More particularly, the invention relates to an improved picker tooth and an improved assembly of such teeth, whereby a broken or otherwise defective tooth can be replaced more readily than has been possible heretofore.

A picker of the type described, as commonly made, comprises a rotary cylinder having on its periphery a plurality of picker bars each holding a series of teeth which perform the tearing or shredding action as the cylinder rotates about its axis. The teeth of each picker bar are normally provided with substantially square bases closely received in an enlarged portion of a longitudinal slot in the bar, each tooth also having a reduced shank extending through a reduced portion of the slot to join the base with the pointed working part of the tooth. The bases of the teeth are slid into the enlarged portion of the slot from one or both ends of the latter and are held in substantially abutting side-by-side relation by releasable means at the end or ends of the slot. Thus, when a tooth remote from either end of the slot is to be replaced, due to breakage or other cause, it is necessary to release the retaining means at one end of the slot and slide through that end of the slot not only the tooth to be replaced but also all the other teeth between the defective one and the opened end of the slot.

The principal object of the present invention is to provide an improved picker tooth and assembly thereof which avoids this disadvantage of the prior structures.

According to the invention, the base of each tooth is generally rectangular, its length (longer dimension) normally extending transversely of the slot and terminating in opposite end surfaces which closely oppose and are slidable along the respective opposite side walls of the slot's enlarged portion. The width of the slot's reduced portion is less than the length of the tooth base but greater than the width of the base as measured between its opposite side surfaces; and each base has opposite rounded corners curving about a central axis of the base on a radius, preferably about one-half the base's length, such that the tooth can be rotated from its said normal position to a withdrawal position in which the base's length is parallel to the slot's length, whereby the base can be withdrawn directly from the slot through its reduced portion. However, such rotation is normally prevented by means retaining the bases in substantially abutting side-by-side relation in the slot's enlarged portion, the retaining means being releasable to permit removing at least one end tooth from the slot while the tooth's base is in said normal position. By such removal to allow sliding of other teeth along the slot, a defective tooth can be rotated to its withdrawal position to permit replacement of the tooth directly through the slot's reduced portion.

The invention will be described in greater detail with reference to the accompanying drawings, in which:

FIG. 2 is a sectional view on line 2—2 in FIG. 1;

FIGS. 4 and 5 are front elevational and bottom views, respectively, of one of the teeth shown in FIG. 1.

Figure 1:
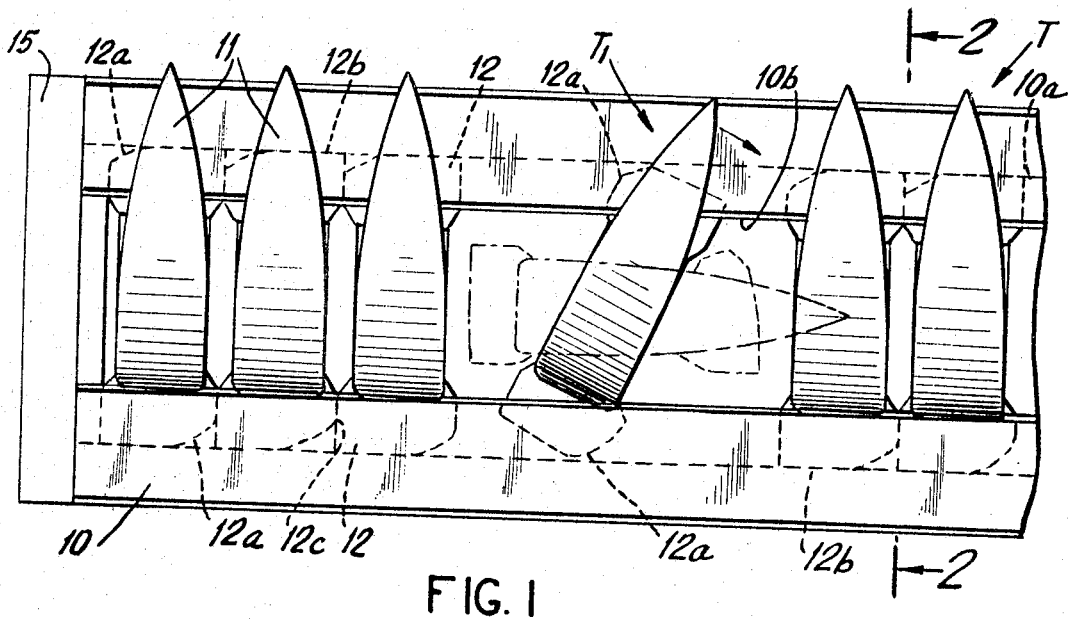
FIG. 1 is a plan view of part of a picker bar having a preferred form of the new teeth and showing one tooth partly rotated from its normal working position to its withdrawal position.
Figure 3:
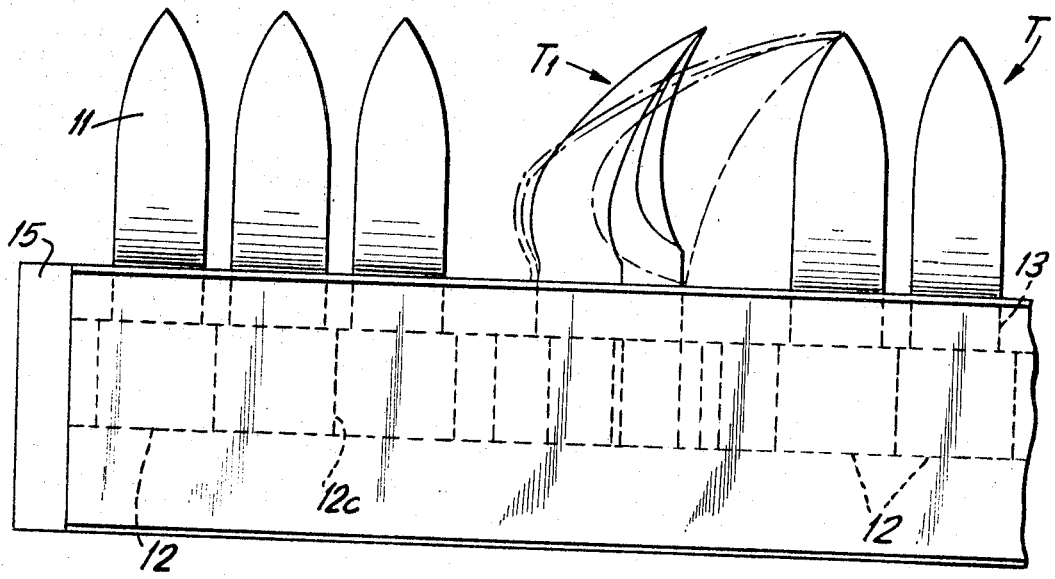
FIG. 3 is a side elevational view of the picker bar and its teeth as shown in FIG. 1.

Referring to FIGS. 1–3, a picker bar 10 has a longitudinal slot which is generally T-shaped in cross section, so as to provide the slot with an enlarged portion 10a which opens through one side of the bar by way of a reduced portion 10b of the slot. The slot 10a–10b extends continuously from one end of the bar to the other.

The picker bar 10 carries a series of teeth T, each tooth comprising a pointed working part 11 located outside the bar, a base 12 fitted closely in the slot enlargement 10a, and a shank 13 extending through the reduced portion 10b of the slot and by which the base 12 is joined to the working part 11. Each tooth base 12 has a generally rectangular shape, as best shown in FIGS. 1 and 5, and two diagonally opposed corners of the base are rounded as shown at 12a. The rounded corners 12a are curved about a central axis A—A normal to the base (FIGS. 2 and 4), the curvature of each corner 12a preferably being on a radius equal to about one-half the length of the base between its two end surfaces 12b. In the normal position of each tooth T, the opposite end surfaces 12b of its base are closely opposed by the opposite side walls of the slot enlargement 10a, as shown in FIGS. 1 and 2, whereby the teeth are retained against any significant movement transversely of the picker bar 10; but there is sufficient clearance between the end surfaces 12b and the opposing side walls of the slot enlargement 10a to permit the bases 12 of the teeth to slide along the slot lengthwise of the bar. Each tooth base 12 has opposite side surfaces 12c which, as shown, are cut away intermediate the ends of the base; and each rounded corner 12a curves between an end surface 12b and an adjacent side surface 12c of the base, as shown particularly in FIGS. 1 and 5.

At least one end of the slot 10a–10b is closed by a member 15 releasably secured to the corresponding end of the picker bar in any suitable manner, as by screws (not shown). By removing the closure member 15, the adjacent tooth T may be slid through the open end of the slot while the tooth is in its normal position, that is, with the length of its base extending transversely of the bar so that the end surfaces 12b are closely opposed by the side walls of the slot enlargement 10a. However, the entire length of the slot is normally occupied by the bases 12 of the series of teeth, and the releasable means 15 serve to hold the teeth against movement lengthwise of the slot and with the opposite side surfaces 12c of each tooth base substantially abutting the opposing side surfaces 12c of the respective adjacent bases, as shown with respect to some of the teeth in FIGS. 1 and 3. It will be understood that the picker cylinder (not shown) is provided with a plurality of picker bars 10 spaced around the periphery of the cylinder and extending lengthwise thereof; and upon rotation of the cylinder about its axis, the pointed working parts 11 of the teeth perform a shredding or tearing action on the mass of fibers presented to the picker. As shown in FIGS. 1 and 2, the working parts 11 of the teeth are pointed lengthwise of the respective bases 12 (transversely of the bar) and in the direction of rotation of the picker cylinder carrying the bar.

Assume that one of the teeth remote from the ends of the picker bar, such as tooth T', is to be replaced because it is broken or unduly worn. The releasable retaining member 15 is removed from one end of the picker bar 10, and the two adjacent teeth T are slid from the picker bar through the open end of slot 10a–10b. The remaining teeth T between the open end of the slot and the defective tooth T' are then slid toward the end of the bar to leave a space sufficient for the tooth T' to be rotated about the axis A—A of its base 12, as shown in FIGS. 1 and 3. Such rotation of the base (clockwise in FIG. 1) is permitted by virtue of the diagonally opposed rounded corners 12a. When the tooth T' has been rotated 90° from its normal position, as shown in dotted lines in FIGS. 1 and 3, the length of its base 12 extends parallel to the length of slot 10a–10b. Thus, the tooth base can be withdrawn directly from the slot through its reduced portion 10b, because the latter has a width greater than the width of the base 12 between its opposite side surfaces 12c. The base 12 of the new tooth is then inserted through the reduced slot portion 10b, with the length of the base extending parallel to the length of the slot, after which the newly inserted tooth is rotated counter-clockwise (FIG. 1) until the length of its base extends transversely of the slot, whereby the tooth is in its normal position in which the end surfaces 12b of its base are parallel to and closely opposed by the opposite side walls of the slot enlargement 10a. The two end teeth T which were removed are then replaced through the open end of the slot, after sliding the intervening teeth and the substituted tooth back against the other teeth in the series, and the releasable member 15 is replaced at the end of the picker bar to hold the assembly of teeth against movement lengthwise of the bar. Consequently, none of the teeth can be rotated to the position for withdrawing its base directly through the reduced slot portion 10b, until the releasable member and the two teeth adjacent thereto are removed from the bar to provide sufficient space for the aforesaid rotation of a defective tooth.

It will be apparent that in the illustrated embodiment of the invention, the removal of two end teeth T is necessary to provide the space for rotation of a defective tooth to its direct withdrawal position, as shown in dotted lines in FIG. 1, because of the ratio of the length to the width of the tooth base 12. However, by varying that ratio, the rotation of a tooth 90° from its normal position can be effected in a space provided by removal of only one tooth from the end of the series. In any event, the present invention enables replacement of a defective tooth remote from either end of the picker bar without the time-consuming task of sliding the defective tooth, and all the other teeth between it and the end of the bar, from the slot 10a–10b by way of its open end and then reassembling the teeth by the reverse procedure.

I claim:
1. In combination with a picker bar having a longitudinal slot generally T-shaped in cross-section to provide an enlargement and a reduced portion by way of which the enlargement opens through one side of the bar, said enlargement being partly defined by a pair of opposite longitudinal side walls spaced from each other to give the enlargement a greater width than the width of said reduced portion, a plurality of teeth each having a working part located outside the bar and a base fitted closely in said enlargement and joined to the working part through said reduced portion of the slot, each base having a pair of opposite end surfaces closely opposing and slidable along said side walls, respectively, and opposite side surfaces extending transversely of the slot and its said side walls, the width of said reduced portion of the slot being less than the length of the base between its said end surfaces but greater than the width of the base between its said side surfaces, each base also having diagonally opposed corners rounded on a radius permitting rotation of the tooth to a position in which said length of its base extends lengthwise of the slot, whereby the base can be withdrawn from the slot through its said reduced portion, and releasable means holding the teeth against movement lengthwise of the slot and with said opposite side surfaces of each base substantially abutting the opposing side surfaces of respective adjacent bases, whereby the bases are releasably retained against said rotation.

2. The combination according to claim 1, in which the slot is provided at one end with an opening through which a tooth base can be withdrawn from the slot while said length of the base extends transversely of the slot, said releasable means including a member blocking said opening and releasably secured to the bar.

3. A picker tooth comprising a generally rectangular base having a central vertical axis and also having a pair of opposite end surfaces spaced from each other by the length of the base and opposite side surfaces spaced from each other by the width of the base, said length being substantially greater than said width, the base also having diagonally opposed rounded corners each curving about said axis on a radius equal to approximately one-half said length, the tooth also having a working part pointed in a direction parallel to said length of the base and which is narrower than said width of the base and a reduced shank portion located on said axis and uniting the top of the base with said working part.

References Cited

UNITED STATES PATENTS 663,583   12/1900   Scaife _____ 19—97 XR
2,927,347  3/1960   Kohler _____ 19—129

DORSEY NEWTON, *Primary Examiner.*

U.S. Cl. X.R.
19—129